United States Patent

Bompard et al.

Patent Number: 5,358,767
Date of Patent: Oct. 25, 1994

[54] TEXTILE STRUCTURE USEFUL AS REINFORCEMENTS IN THE MANUFACTURE OF COMPOSITE MATERIALS, AND TECHNICAL YARNS FOR SUCH STRUCTURES

[75] Inventors: Bruno Bompard; Jean Charles Durand, both of Lyon; Jean Paul Lamarie, Caluire, all of France

[73] Assignee: Brochier S.A., Decines Cédex, France

[21] Appl. No.: 566,359

[22] PCT Filed: Dec. 22, 1989

[86] PCT No.: PCT/FR89/00676

§ 371 Date: Oct. 22, 1990

§ 102(e) Date: Oct. 22, 1990

[87] PCT Pub. No.: WO90/07422

PCT Pub. Date: Jul. 12, 1990

[30] Foreign Application Priority Data

Dec. 23, 1988 [FR] France .................. 88 17135

[51] Int. Cl.⁵ .............. D03D 27/00; D03D 3/00; D02G 3/36; D02G 3/02
[52] U.S. Cl. .......................... 428/86; 428/85; 428/92; 428/229; 428/292; 428/371; 428/397; 57/203; 57/206; 57/207; 57/208

[58] Field of Search ............ 428/85, 92, 229, 292, 428/371, 397, 86; 57/203, 206, 207, 208

[56] References Cited

U.S. PATENT DOCUMENTS

| 3,715,878 | 2/1973 | Kim | 57/24 |
| 3,775,228 | 11/1973 | Leary | 428/229 |
| 3,808,087 | 4/1974 | Milewski et al. | 428/86 |
| 3,986,331 | 10/1976 | Brumlik | 428/371 |
| 4,157,645 | 6/1979 | Sostegni | 57/24 |
| 5,118,569 | 6/1992 | Kuroda et al. | 428/367 |

FOREIGN PATENT DOCUMENTS

| 864395 | 4/1941 | France . |
| 2110986 | 5/1972 | France . |
| 2146941 | 3/1973 | France . |

*Primary Examiner*—George F. Lesmes
*Assistant Examiner*—Terrel Morris
*Attorney, Agent, or Firm*—Wenderoth, Lind & Ponack

[57] ABSTRACT

Textile structure useful as a reinforcement in the manufacture of composite materials is produced using technical yarns. At least some of the yarns are formed from three constituents, namely a substantially straight core, a relief yarn, and an independent binding yarn. The relief yarn is secured to the core by the binding yarn.

15 Claims, 1 Drawing Sheet

TEXTILE STRUCTURE USEFUL AS REINFORCEMENTS IN THE MANUFACTURE OF COMPOSITE MATERIALS, AND TECHNICAL YARNS FOR SUCH STRUCTURES

BACKGROUND OF THE INVENTION

The present invention belongs to the field of textile components for the manufacture of composite materials. More particularly, the present invention relates to textile structures capable of serving as reinforcements in composite materials. It also relates to technical yarns or threads of novel configuration which are intended for such structures.

It is known that composite materials are formed from an intimate combination of reinforcing textile structures and impregnating resins or matrices. Such materials are widely employed at present, for example in the aeronautical industry. In order to obtain materials having the desired properties, it is necessary to use a relatively high proportion of textile structure, in particular by building up various reinforcing layers. It is known, however, that the impregnation of such reinforcing layers by the resins is not achieved optimally. Owing to the effect of mechanical stresses, this results in damage to the composite material due to a separation of certain layers within the textile reinforcement which is known to those skilled in the art as "delamination". It will be understood that, in view of the applications of such composite materials, it is essential to remedy such disadvantages.

One of the means proposed in the prior art to overcome such disadvantages consists, at least partly in the textile reinforcement, of a multidimensional, for example three-dimensional, structure. Such structures are satisfactory but they are expensive and take a long time to fabricate.

It may be said that the current criteria for choosing a textile structure serving as reinforcement of composite materials are: the nature of the yarns, the distribution and orientation of the latter, and also their method of use (for example in the form of woven structures or unidirectional laps). These criteria are used as a function of the desired properties for the composite material.

SUMMARY OF THE INVENTION

An object of the present invention is to provide textile structures and yarns, the configuration of which enables a dimensional effect to be obtained in a reinforcement for composite materials, thereby making it possible to control delamination effectively and consequently to enhance the performance and safety of the composite materials thus obtained.

Another object of the invention is to provide a textile structure useful as a reinforcement in the manufacture of composite materials, said structure being produced at least partly using technical yarns comprising a core carrying projecting components which give the yarn a raised or relief configuration.

"Technical yarn" is understood to mean any yarn which can be used in structures intended for reinforcing composite materials, whether mineral, artificial or synthetic in nature. Such yarns, whether alone or mixed, are known to a person skilled in the art and are, for example, chosen from amongst carbon, aramid, glass, quartz, silica, silicon carbide, ceramic and similar yarns.

In the prior art, it had already been proposed in certain applications to subject a yarn to a surface treatment known as texturization, intended to slub the yarn. Reference may be made to U.S. Pat. No. 3,775,228. It will be noted first of all that such a texturization treatment cannot be employed for a large number of technical yarns, in particular on account of their low bending strength. Above all, however, texturization changes the appearance of the yarn itself without adding any other additional element. Moreover, the effect of texturization is only superficial and cannot be compared to a raised configuration as provided by the present invention. The latter, for example, may be created by adding loops and/or pile hairs onto the support yarn (core). The orientation of such reliefs, for example of these loops and/or pile hairs, produces a multidirectional effect which can be predetermined or, in contrast, random.

In the conventional textile art, it is known to produce fancy articles comprising yarns with additional elements, for example of the tinsel type.

U.S. Pat. No. 4,157,645 discloses a machine for the production of looped fancy yarn. This yarn consists of three yarns, one of which forms loops which are held by two other yarns twisted with respect to one another.

A twisted yarn has a tensile strength lower than that of a straight yarn. This fancy yarn is therefore not suitable as a textile reinforcement for composite materials which may be subjected to considerable stresses.

Reference may also be made to GB-A-747,726 which relates to the manufacture of reinforced plastic materials. This patent describes chenille yarns consisting of a central part comprising two intertwined metallic yarns, between which fibers are wedged.

It is not advantageous to use such chenille yarns to produce composite articles whose safety and performance it is desired to enhance, since the tensile strength of the chenille yarns is lower than that of the metallic yarns which are included in their composition.

The same applies to the yarns described in a number of exemplary of the state of the art, for example GB 804,464, FR 2,110,986 and FR 864,395 patents, which describe intertwined yarns, between which projecting fibers are jammed.

A yarn according to the present invention can be produced by starting from a substantially straight core, to which a yarn having loops, which are regular or otherwise, is combined in order to form a core/loop-yarn arrangement, said arrangement being held together by at least one independent holding or binding yarn. It is also possible to produce a yarn having a relief configuration with loops by combining a plurality of loop yarns with a substantially straight core in order to increase further the multidirectional character of the reliefs.

In the present description, the term substantially straight cores denotes a yarn or arrangement of yarns not having undergone twisting.

It will be understood that, by using a straight core, the tensile strength of the yarn according to the invention is much higher than that of the known yarns.

FR-A-2,146,941 discloses a composite yarn for nonwoven fabric which, in one embodiment, comprises a straight core on which thermoplastic needles are held by means of a binding yarn. These needles are intended to provide the finished article with cohesive resin but do not take part in the textile reinforcement and cannot therefore provide the three-dimensional characteristics as can the yarns of the invention.

Yarns, for example of carbon, on which projecting elements are fixed by chemical means are also known (U.S. Pat. No. 3,808,087). Such structures are not obtained by textile means and contain in particular no independent binding yarn.

According to another embodiment of the present invention, in a consecutive step, the relief loops can be cut to produce individual elements resembling pile hairs or sprigs which project from the core. Other alternative embodiments enable such structures with pile hairs to be obtained, for example by starting from a core with which a zigzag yarn held by a binding yarn is combined and then performing a cutting operation to form separated pile hairs.

A person skilled in the art will understand that a yarn according to the invention can have a wide variety of forms depending on the nature of its components. The yarn in question can be "pure", that is to say it can be formed from a single textile component belonging to the categories of technical yarns mentioned above. However, even if the nature of the components is the same, some of the components may themselves have distinctive surface features and have undergone, if the nature of the yarn permits, a texturization treatment, as is the case with glass.

According to the invention, it is also possible to produce "hybrid" yarns, comprising a core made of a textile component and at least one relief yarn and/or a binding yarn made of at least one other textile component. A "hybrid" yarn may also comprise at least one component (core, relief yarn, binding yarn) itself having a hybrid nature. A typical example of a hybrid yarn is a yarn comprising a silica or carbon core and carbon reliefs. The invention therefore provides a means for associating components of technical yarns in accordance with the properties desired in the final textile structure. In the textile structures based on technical fibers and intended for reinforcing composite materials, a support core has heretofore not been combined with additional elements which may be different in their nature from said core.

As has been mentioned above, the textile structures useful as reinforcements in the manufacture of composite materials comprise at least one yarn with a relief configuration.

Such a textile structure can be of the unidirectional or multidirectional type, for example fabric, lap, filamentary winding and the like. Such structures may consist solely of yarns with a relief configuration or, in a variant, may consist of a combination of yarns with a relief configuration and conventional yarns. By way of example, it is possible to produce a fabric having a yarn with a relief configuration mixed with a plurality of normal yarns.

Such textile structures are essentially intended to serve as reinforcements for composite materials. A further object of the invention is, therefore to provide a reinforcement for composite materials, comprising at least one textile structure with yarns with a relief configuration of the type mentioned above. Such a reinforcement may consist solely of textile structures according to the invention or, in a variant, may consist of a combination of structures according to the invention and conventional textile structures.

By way of example, it is possible to produce, according to the invention, a reinforcement of the laminated type consisting of a layered arrangement of structures such as fabrics or unidirectional laps. The layered arrangement may be homogeneous, that is to say it may comprise structures of similar nature. Alternatively, conventional layers and layers of structures according to the invention may be used together.

By virtue of the invention, a person skilled in the art has at his disposal many possibilities for obtaining the most suitable reinforcements.

Although the invention makes it possible to obtain, by virtue of the relief configurations of the yarns, very useful multidirectional orientations, it is perfectly possible to produce structures of the three-dimensional (3D) type by using such yarns at least in part.

Moreover, the yarns according to the invention can be employed in textile structures which can be marketed as they are. It is, however, also possible to supply the end user with a yarn with a relief configuration which can be employed in a filamentary winding technique (spooling) in accordance with the intended form of the article to be made of the composite material.

The yarns according to the invention and the corresponding textile structures may comprise components intended to facilitate the manufacture of the composite material. For example, the core of the yarn may be impregnated or coated beforehand with thermoplastic material, as is known in the case of the so-called FIT yarns. Furthermore, thermoplastic powder may be added to the textile structures, making it possible to facilitate their handling and their final implementation.

In order to manufacture composite articles subjected to non-uniform stresses, it is possible to produce textile structures using yarns according to the invention, the number of reliefs, loops or pile hairs of which, and also the form of which, are not uniform so as to be tailored to the stresses to which the final composite article is subjected.

In this way, at the most stressed locations of the article or composite material to be manufactured, it is possible to use textile structures whose constituent yarns according to the invention have a greater density of reliefs so as to increase the proportion of fibers by volume at these locations.

According to the invention, the use in a textile structure of yarns having a relief configuration:
ensures better cohesion of the textile structure,
permits the formation of gaps between some of its components, for example between weft yarns and warp yarns in the case of weaving,
in a general way, permits an adjustment of the textile filling, and
affords a considerable increase in the attaching and adhesion:
of the matrix (for example resin) to the textile structure during the fabrication of the composite material, (for example by injection), and
of the constituent layers in the composite material relative to one another.

The invention thus ensures better resistance to the delamination of the composite materials, in particular in the event of impact.

BRIEF DESCRIPTION OF THE DRAWINGS

The invention will be further described without as follows, given with reference to the accompanying drawings, in which.

DETAILED DESCRIPTION OF THE PREFERRED EMBODIMENTS

Figure 1:
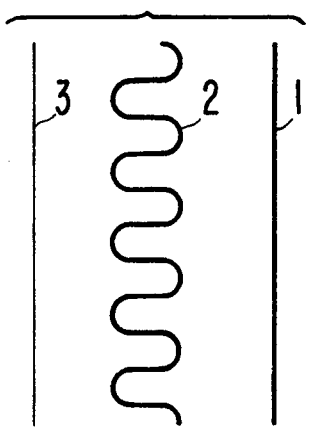
FIG. 1 is a schematic of the constituents of a yarn for a textile structure according to the invention.
Figure 2:
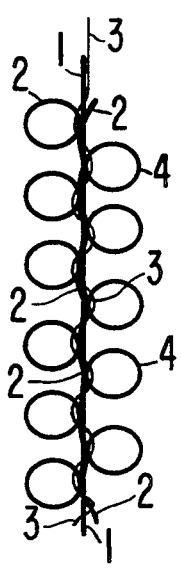
FIG. 2 is a schematic of the yarn illustrating the relief configuration thereof with loops.

The yarn illustrated in FIGS. 1 and 2 is designated by reference numeral 10. It comprises essentially a straight core 1 secured to a looped yarn 2 by a binding yarn 3. FIG. 1 illustrates the three components of the yarn 10 and FIG. 2 shows the yarn after manufacture. The representation of FIG. 2 is somewhat deformed in order to show the various components of the yarn; in practice, said components are intimately combined. It can be seen that this yarn 10 has relief configurations 4 in the form of loops, whose orientation in space is variable about the core 1, thereby producing a multi-dimensional effect about the yarn.

Figure 3:
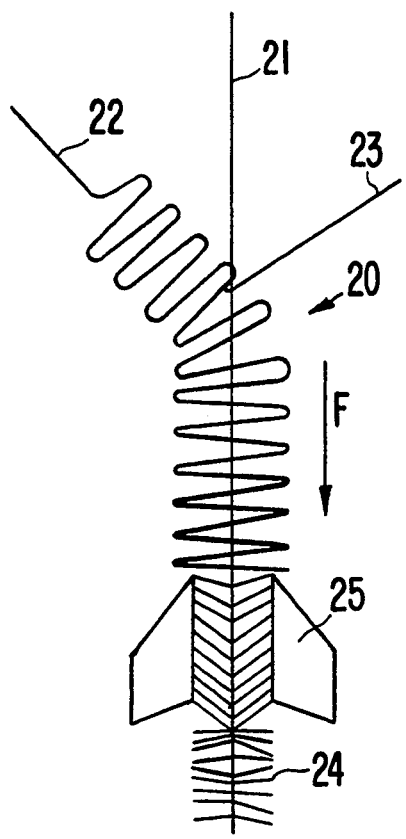
FIG. 3 is a schematic for use in illustrating the production of a yarn having a relief configuration with pile hairs according to the invention.

FIG. 3 illustrates a similar embodiment but the yarn comprises pile hairs. The three constituents of the yarn 20 are shown diagrammatically and consist of a straight core 21, a yarn 22 having a general zigzag, i.e. crimped, configuration and a binding yarn 23. The three constituents are held together in a known manner on a textile loom and the yarn 20 is displaced longitudinally in the direction of the arrow F and arrives at a cutting device 25 which shaves the crimped ends of the yarn 22 to produce pile hairs 24 which project from the core 21 and thus give the yarn 20 a relief configuration.

The manufacturing operations can be repeated, both with regard to loop yarns and pile hair yarns, in order to give them a plurality of relief configurations, and these operations can be carried out at the same time as the production of the yarn or successively thereafter.

Figure 4:
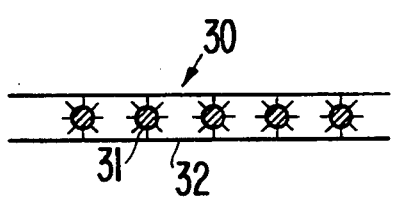
FIG. 4 is a schematic cross-sectional view of a textile structure according to the invention.

FIG. 4 illustrates schematically a unidirectional lap 30 having relief yarns 31 according to the invention, which are held by a binding 32.

Figure 5:
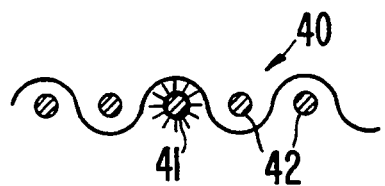
FIG. 5 is a schematic cross-sectional view of another embodiment of a textile structure according to the present invention.

FIG. 5 illustrates a fabric 40 comprising, as warp and/or as weft, yarns 41 according to the invention and conventional yarns 42.

Figure 6:
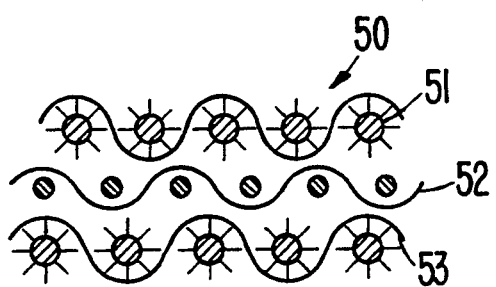
FIG. 6 is a schematic cross-sectional view of arrangement of textile structures which can constitute a reinforcement for composite materials.

FIG. 6 shows a layered arrangement of textile structures capable of serving as a reinforcement in composite materials. This reinforcement, designated by reference numeral 50, comprises, in the example shown, three layers of fabric 51, 52, 53. The layers 51 and 53 are fabrics according to the invention with yarns having a relief configuration, whereas the layer 52 is a conventional fabric.

It goes without saying that the above embodiments are only illustrative of the invention and that the combinations of yarns according to the invention and of conventional yarns can be varied, as can those of the structures according to the invention and of the known structures.

It will also be noted that FIGS. 4 to 6 illustrate textile structures produced in the form of fabrics or unidirectional laps. The yarns according to the invention can also be employed, as mentioned above, in three-dimensional structures or as filamentary windings. For example, it is possible to produce with such yarns spools which can be directly impregnated with a resin so as to produce a composite material.

The invention will be further illustrated without in any way being limited by the following examples.

EXAMPLE 1

This example embodies a textile structure according to the invention., obtained from a technical yarn of the general type described in FIG. 2.

This textile structure is a fabric having the following characteristics:

Unidirectional fabric: 700 g/m2
Weave: taffeta
Structure: 3.3 yarns/cm × 10 strokes/cm
Warp material: glass E 11 Tex textile size
Weft material: technical yarn according to the invention, described below.

The technical yarn according to the invention is produced with three yarns of different count:

core 1: glass yarn E 300 Tex textile-plastic size,
loop yarn 2: yarn comprising glass loops E 34 Tex textile-plastic size,
binding yarn 3: glass yarn E 68 Tex textile-plastic size.

The loops 4 of the yarn 2 are arranged regularly every 2.5 mm, their number per meter therefore being approximately 400.

The mean diameter of the loops 4 is 4 mm.

Furthermore, it is found that the technical yarn produced according to the invention has a dimensional effect with a distribution of 60% of fibers in the weft direction (X direction) and of 60% of fibers in the Y and Z directions, the Y direction being perpendicular to the X direction and the Z direction orthogonal to the plane formed by the two directions X and Y.

Consequently, the fabric obtained by using technical yarns according to the invention has fibers which are perpendicular to the weaving plane with a mass of fibers:

in the X direction (weft direction) equal to 420 g/m2
in the Y and Z directions equal to 280 g/m2.

In order to demonstrate the advantages afforded by the invention, the bending strength of a composite produced by building up layers of fabrics according to the invention and of a composite produced by building up layers of conventional fabrics are compared.

a) In order to produce a composite $C_1$ using the textile structures of the invention, different layers of fabric as described above were built up in the same direction (see, for example, FIG. 6 described above).

When building up the different layers, an intimate interlacing of the loops of the different layers can already be observed.

Once the different layers have been built up, a composite $C_1$ is produced by injecting resin into the layers under vacuum and under pressure, the resin in this case being an epoxy resin (CIBA GEIGY X 3052 A/B).

b) For comparison, a composite $C_2$ is produced under the same operating conditions with the aid of the following fabric:

Unidirectional fabric: 425 g/m2
Weave: taffeta
Structure: 3.3 yarns/cm × 14 strokes/cm
Warp material: glass E 11 Tex textile size
Weft material: glass E 300 Tex textile-plastic size.

Thus, given the above fabric structure, the mass of fibers in the X direction (weft direction) is equal to 420 g/m2, that is to say identical to that of the fabric produced by using the technical yarns according to the invention.

For comparison, the above-defined composites $C_1$ and $C_2$ were subjected to bending tests in accordance with the standard NF T 57-105 (June 1977). The latter corresponds to the European Standard EN63 of March 1977 entitled "Determination of Bending Characteristics-Three-failure Method". The tests were carried out in the weft direction (X direction). The masses and volumes working in this direction are identical for both composites $C_1$ and $C_2$. Under an applied force of 1050N, it is found that the composite $C_2$ breaks suddenly, in contrast to the composite $C_1$ which possesses a significantly higher elongation at break. The breaking threshold of the composite $C_1$ is progressive, whereas the composite $C_2$ exhibits a clean breakage.

It can be seen therefore that the composites manufactured with textile structures according to the invention possess higher bending and impact strengths as than that of conventional composites.

EXAMPLE 2

This example embodies a yarn according to the invention of the type shown in FIG. 2.

This yarn is produced from silicon carbide with:
- a core: 2 yarns of 500 filaments (Nicalon NL202),
- a binding yarn: 1 yarn of 250 filaments (Nicalon NL217) bound at 300 turns per meters
- a loop yarn: 1 yarn of 250 filaments forming plush loops.

The loop yarn comprises 160 loops of 8 mm diameter per linear meter.

EXAMPLE 3

This example likewise embodies a yarn according to the invention. This yarn is identical to that of Example 1, except with regard to the loop yarn which in this example comprises 160 loops of 4 mm per linear meter.

EXAMPLE 4

This example further embodies a yarn according to the invention. This yarn is identical to that of Examples 2 or 3, except with regard to the loop yarn which in this exam comprises 80 loops of 4 mm diameter per linear meter.

EXAMPLE 5

This example embodies a yarn according to the invention in which the number of loops and their form vary over the length of the yarn. This yarn consists, over a given length, of a yarn produced according to Example 1, then of that produced according to Example 2 and finally of the yarn according to Example 3.

From such a yarn, it is possible to produce textile structures which can be used as reinforcements in the manufacture of composite materials subjected to nonuniform stresses.

We claim:

1. A textile structure useful as a reinforcement in the manufacture of composite materials, said structure comprising technical yarns, wherein each of at least some of said yarns includes:
   a substantially straight core so as to be nontwisted,
   a relief yarn having reliefs of a multidimensional raised configuration, and
   an independent binding yarn, the relief yarn being secured to the core by the binding yarn.

2. The textile structure according to claim 1, wherein said at least some of said technical yarns are selected from the group consisting of carbon, aramid, glass, quartz, silica, silicon carbide, and ceramic yarns, alone or in combination.

3. The textile structure according to claim 1, wherein said reliefs are loops and/or crimps.

4. Textile structure according to claim 1, wherein said reliefs are pile hairs.

5. The textile structure according to claim 1, wherein said reliefs are multidirectionally oriented.

6. The textile structure according to claim 1, wherein constituents of the technical yarns are texturized.

7. The textile structure as claimed in claim 1, and further comprising a binding holding said technical yarns in a layer in the structure, all of said technical yarns extending in the same direction in said layer whereby the textile structure is unidirectional.

8. The textile structure as claimed in claim 1, and further comprising a binding holding said technical yarns in a layer in the structure, said technical yarns extending in a plurality of directions in said layer whereby the textile structure is multidirectional.

9. The textile structure as claimed in claim 1, and further comprising a binding holding said technical yarns together in the structure, and wherein all of said technical yarns are said yarns including a substantially straight core so as to be non-twisted, a relief yarn and an independent binding yarn.

10. The textile structure as claimed in claim 1, and further comprising a binding holding said technical yarns together in the structure, and wherein only some of said technical yarns are said yarns including a substantially straight core so as to be non-twisted, a relief yarn and an independent binding yarn.

11. A reinforcement for composite materials, comprising at least one textile structure of technical yarns, at least some of said yarns including:
    a substantially straight core so as to be non-twisted,
    a relief yarn having reliefs of a multidimensional raised configuration, and
    an independent binding yarn, the relief yarn being secured to the core by the binding yarn; and
    a matrix permeating each said at least one textile structure.

12. The reinforcement according to claim 11, wherein each of said at least one textile structures in the reinforcement is a said structure comprising technical yarns.

13. The reinforcement according to claim 11, wherein said at least one textile structure comprises a plurality of textile structures, and only some of said textile structures is/are a said structure comprising technical yarns.

14. The reinforcement according to claim 11, wherein said matrix is thermoplastic resin.

15. Technical yarn for producing textile structures and reinforcements, said technical yarn comprising:
    a substantially straight core so as to be non-twisted,
    a relief yarn having reliefs of a multidimensional raised configuration, and
    an independent binding yarn, the relief yarn being secured to the core by the binding yarn.

* * * * *